United States Patent Office 3,217,754
Patented Nov. 16, 1965

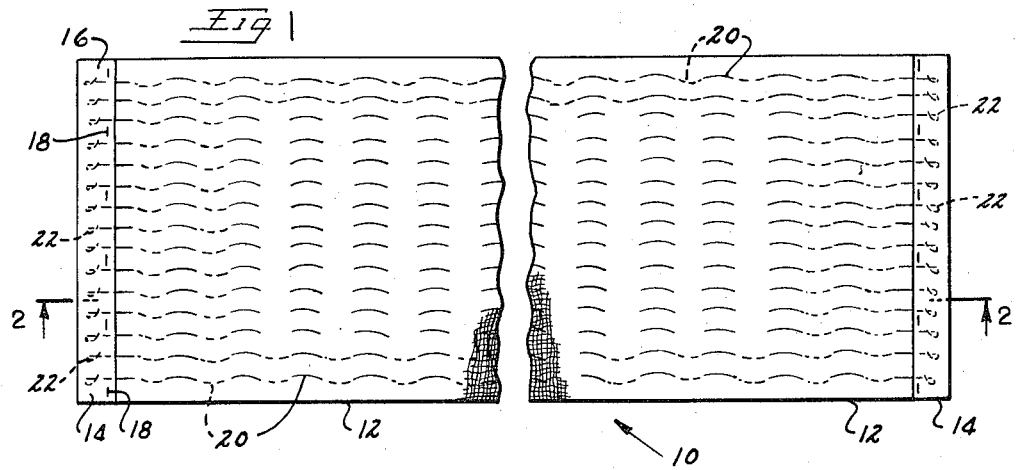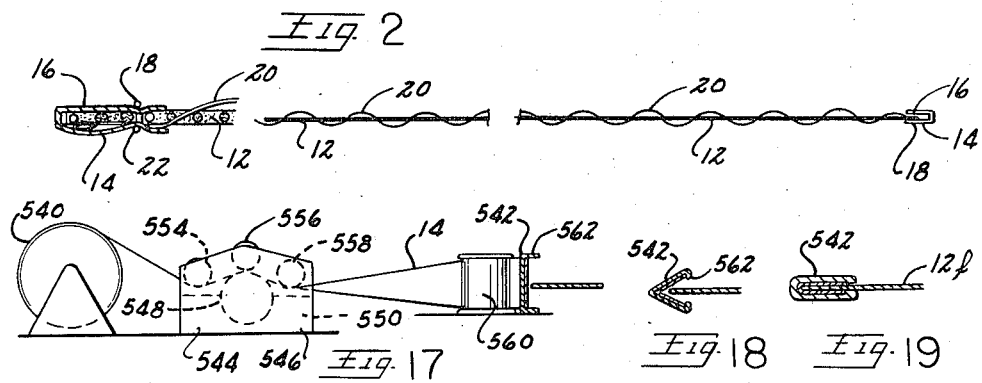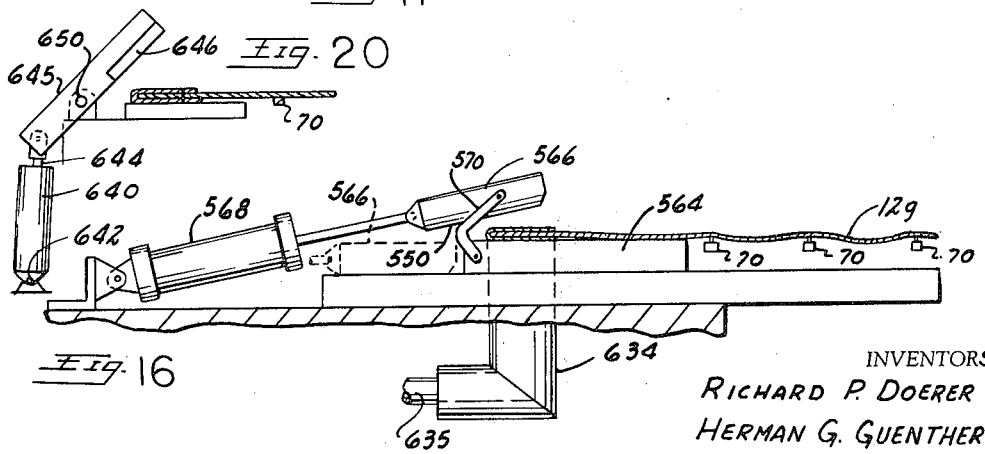

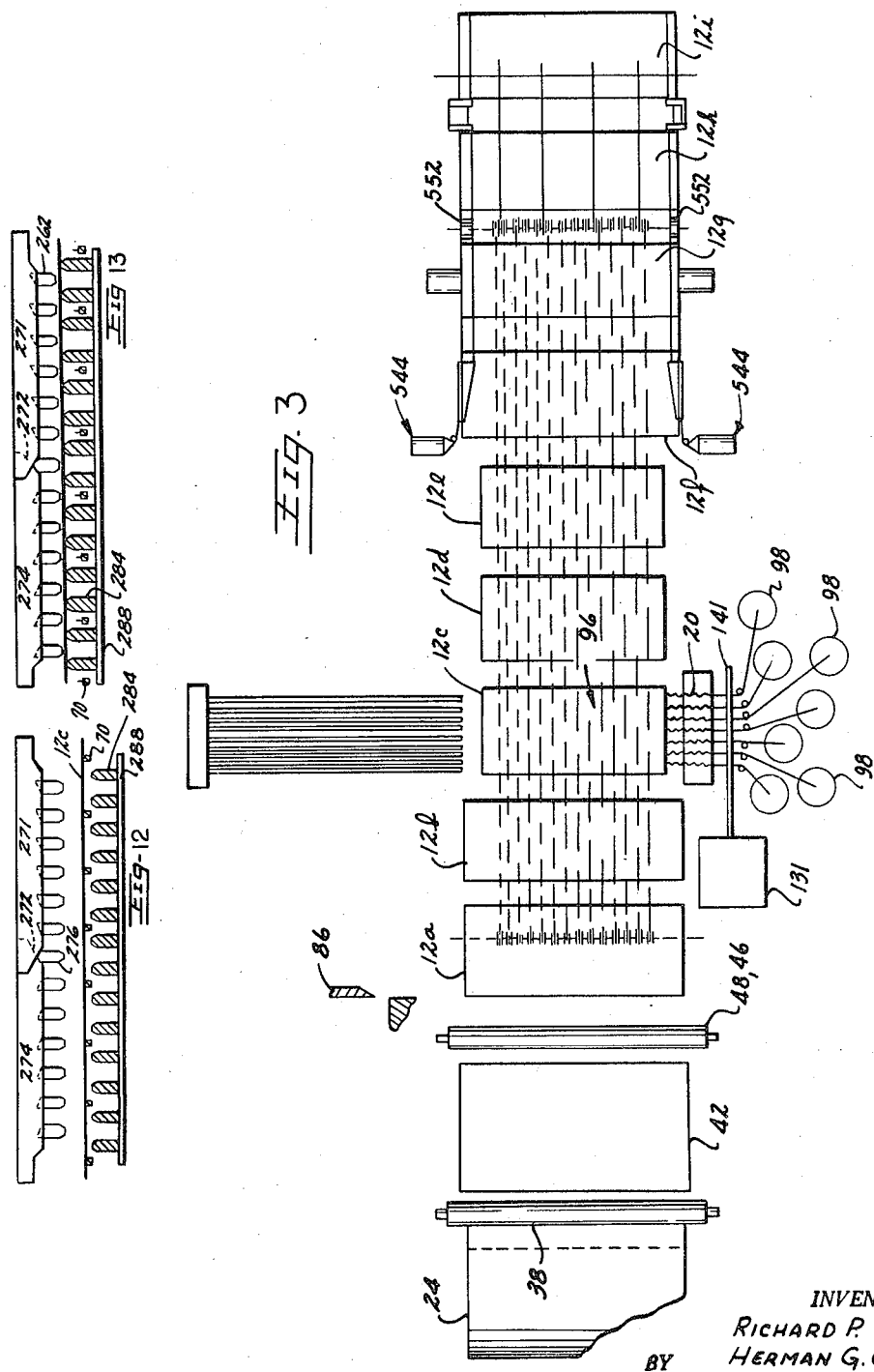

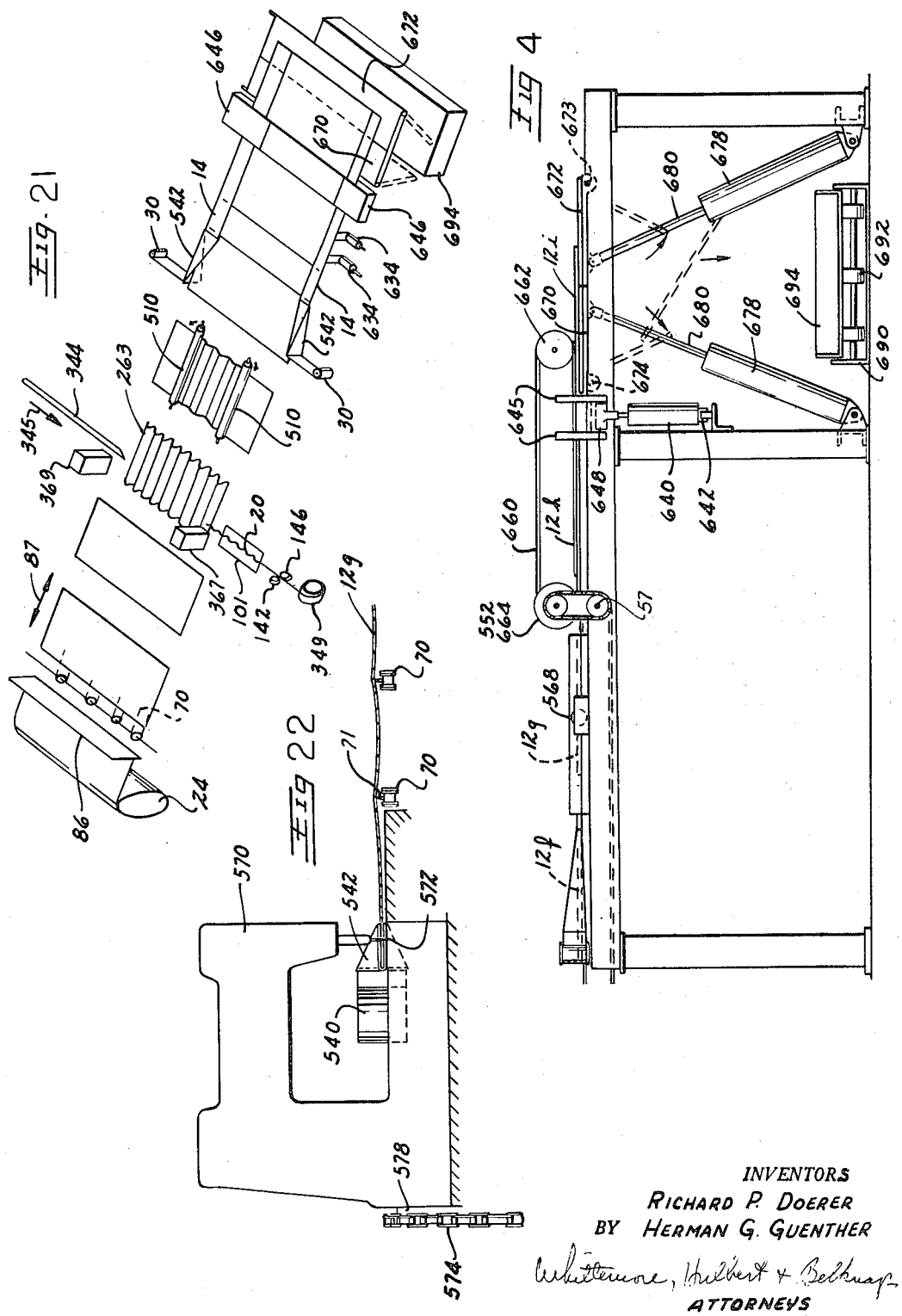

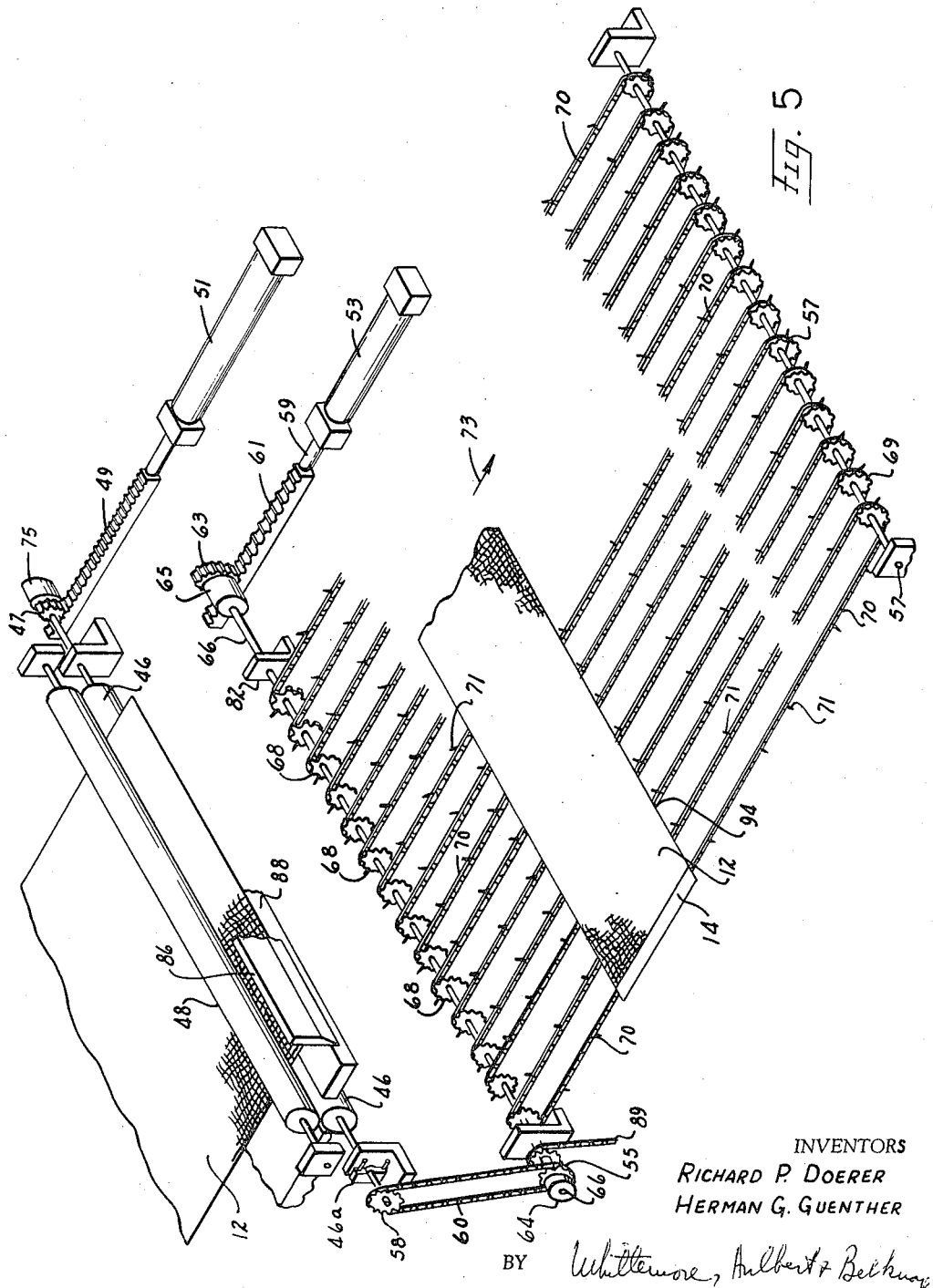

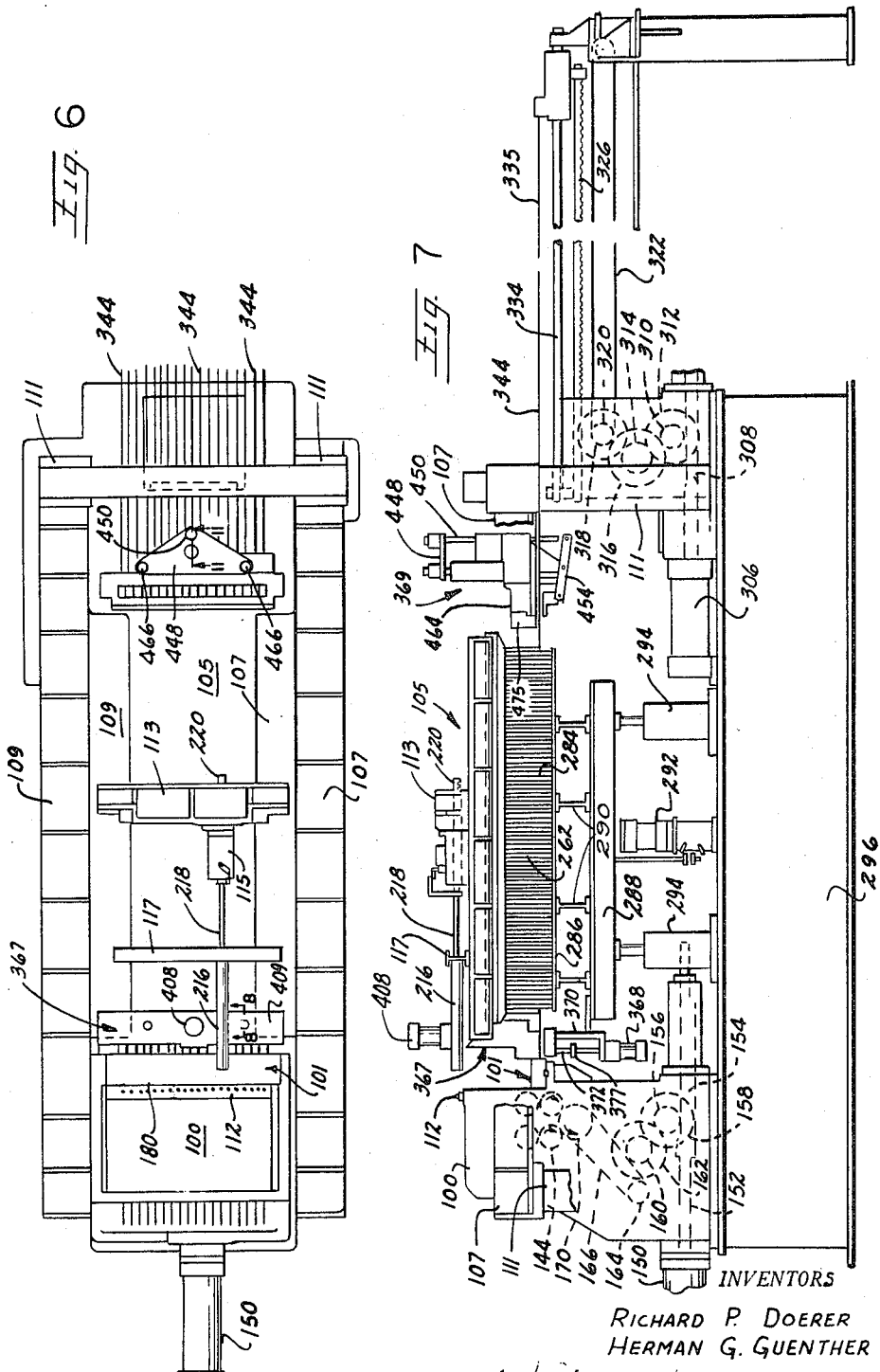

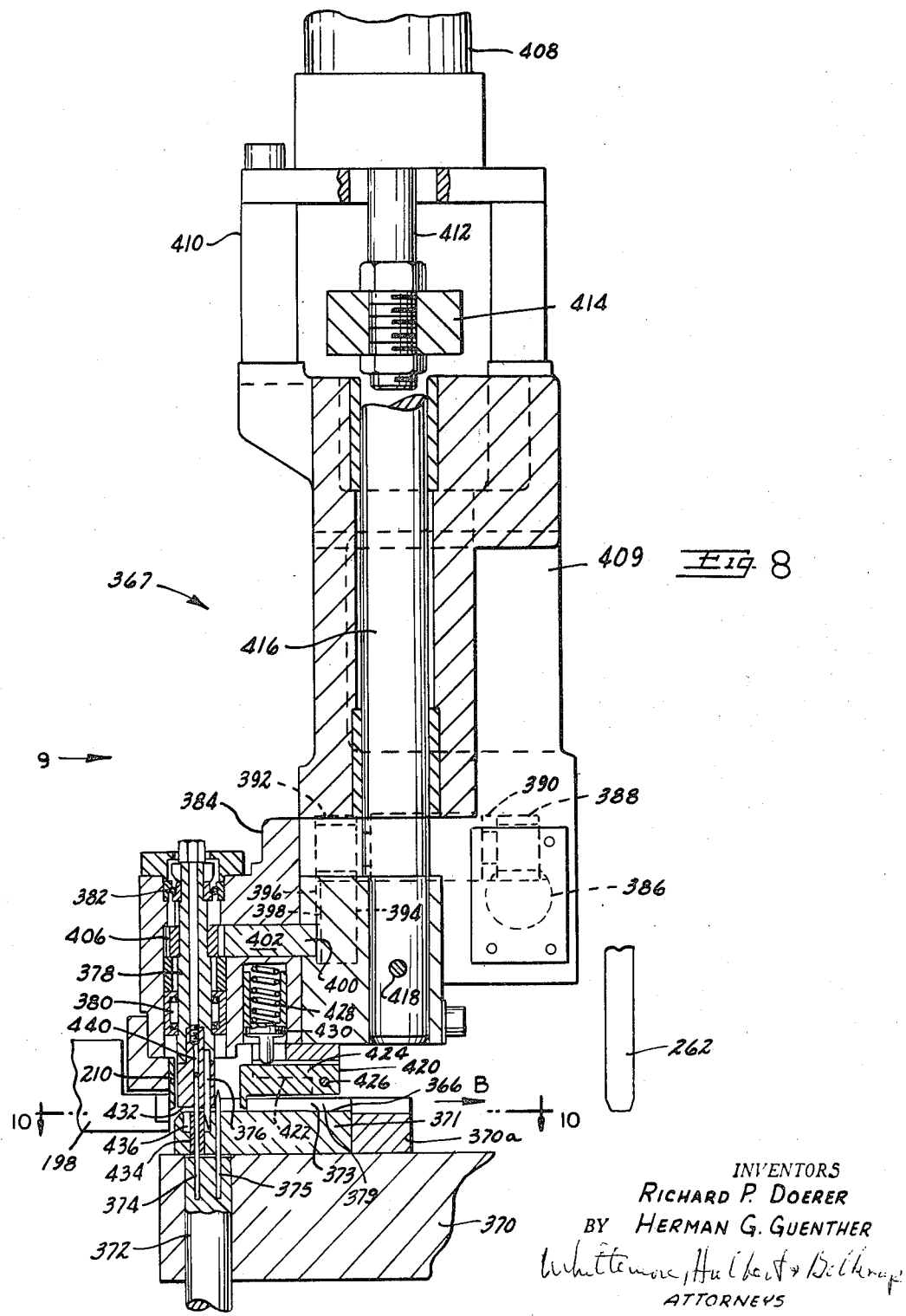

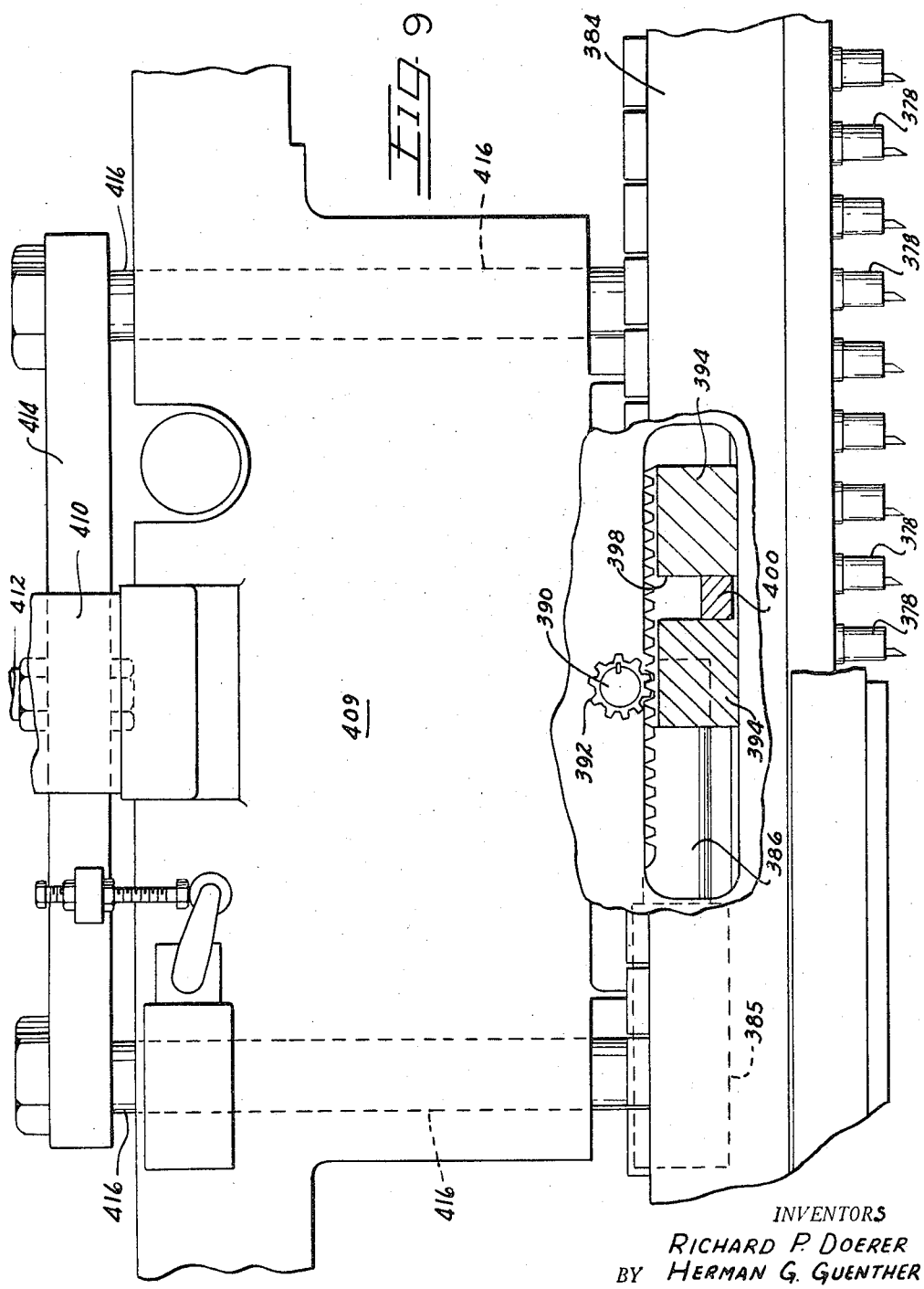

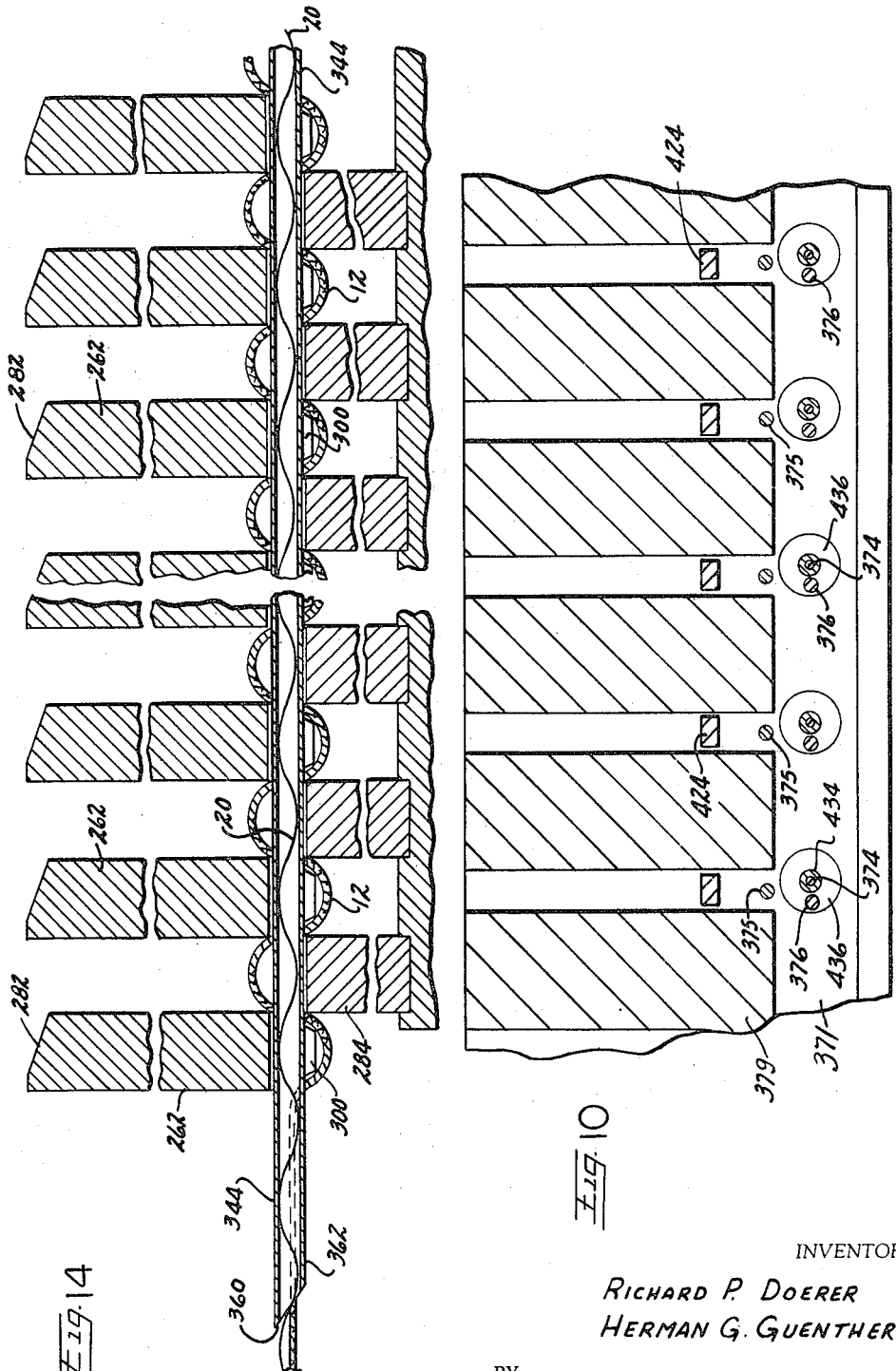

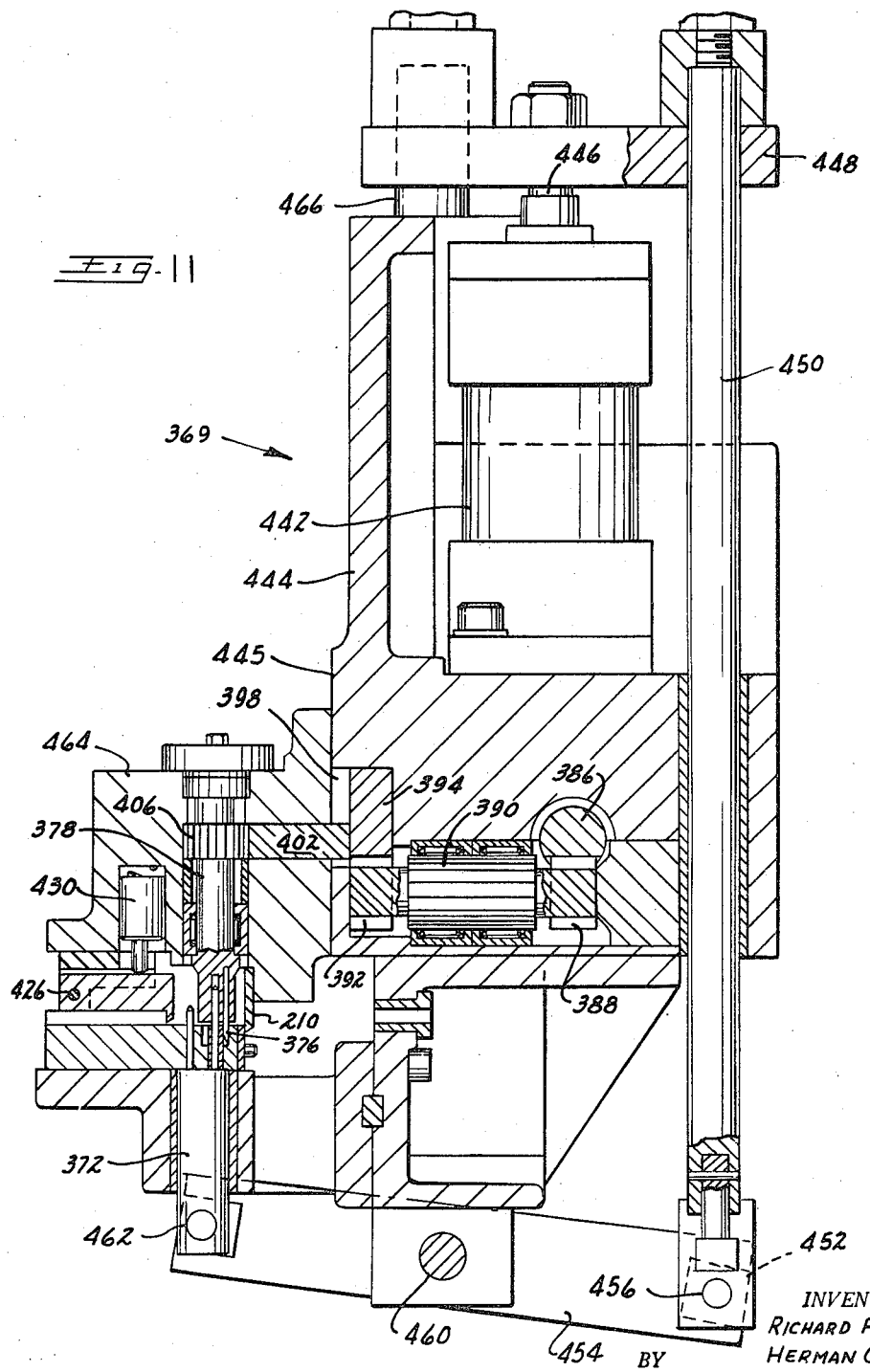

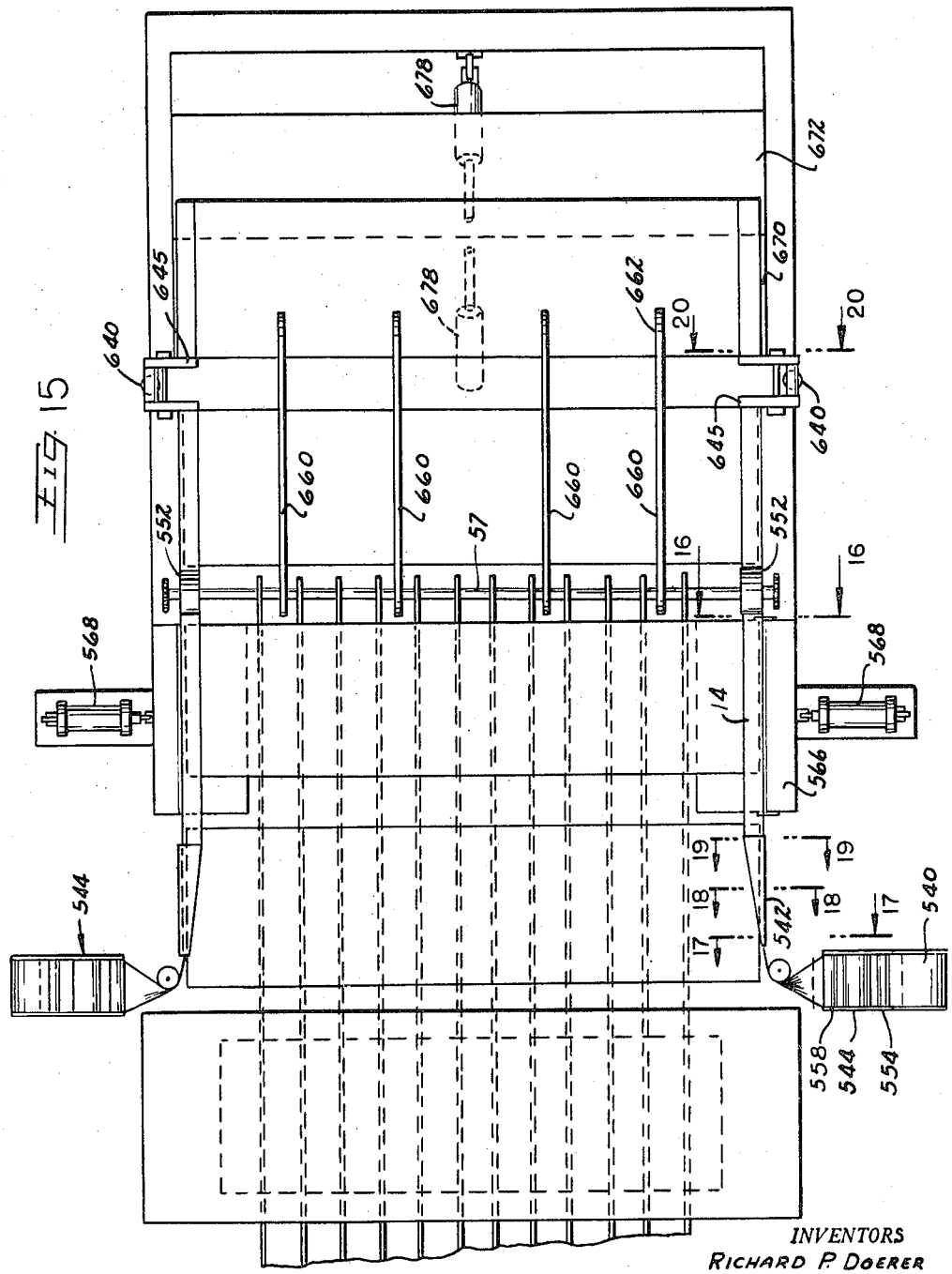

3,217,754
APPARATUS FOR CONVEYING, STRAND FEEDING AND APPLYING A REINFORCING EDGING TO A FABRIC MATERIAL
Richard P. Doerer, Ypsilanti, Mich., and Herman G. Guenther, Bakersfield, Calif., assignors to Van Dresser Specialty Corporation, Warren, Mich., a corporation of Michigan
Original application June 23, 1960, Ser. No. 38,402. Divided and this application Oct. 15, 1964, Ser. No. 404,031
17 Claims. (Cl. 140—3)

This application is a division of our co-pending application Serial No. 38,402 filed June 23, 1960.

This invention relates generally to apparatus for making a strand-reinforced panel and refers more particularly to devices for inserting the reinforcing strands into the panel and for covering the ends of the inserted strands.

Reinforced fabric panels of the type described herein are manufactured by inserting into a web or panel of fabric material elongated strands preferably in the form of wires to reinforce the material. A reinforced panel of this type may serve as an insulator between the overlying padding and underlying supporting spring structure of an upholstered assembly, for example.

One object of the invention is to provide means for inserting reinforcing strands into the panel and for thereafter covering and shielding the ends of the inserted strands.

Another object is to provide means for folding the coverings over the opposite ends of the strands.

Another object is to provide coverings in the form of strips, and guides which gradually convert the strips from a flat condition to a U-shaped, folded condition.

Another object is to provide guides formed with angularly related connected flanges folded closely together at their exit ends and gradually flaring apart toward their entrant ends.

Another object is to provide means for advancing the strips in synchronism with the panel.

Another object is to provide means operated either between or during intermittent advances of the panel for securing the folded strips to the opposite lateral edges of the panel.

Another object is to provide means for severing the strips after they have been secured to the panel.

Other objects and features of the invention will become apparent as the description proceeds, especially when taken in conjunction with the accompanying drawings, wherein:

FIGURE 1 is a plan view of a strand reinforced fabric panel adapted to be formed by the apparatus shown diagrammatically in FIGURE 3.

FIGURE 2 is a sectional view taken on the line 2—2 of FIGURE 1, with the left hand portion of the panel enlarged.

FIGURE 3 is a plan view diagrammatically showing the apparatus for forming the strand reinforced panels of FIGURE 1, indicating also the positions of various fabric panels as they are advanced through the apparatus.

FIGURE 4 is a side elevational view of the right hand portion of the apparatus shown in FIGURE 3.

FIGURE 5 is a perspective view showing the drive for the panel conveyor.

FIGURE 6 is a plan view of portions of the apparatus shown in FIGURE 3, including the pleater structure.

FIGURE 7 is an elevational view of the structure shown in FIGURE 6.

FIGURE 8 is an enlarged sectional view on the line 8—8 of FIGURE 6 showing one of the knotting devices.

FIGURE 9 is an elevational view taken in the direction of the arrow 9 in FIGURE 8.

FIGURE 10 is a sectional view taken on the line 10—10 of FIGURE 8.

FIGURE 11 is a sectional view taken on the line 11—11 of FIGURE 6.

FIGURE 12 is a diagrammatic view of certain operating components of the pleater structure in retracted position.

FIGURE 13 is a diagrammatic view similar to FIGURE 12, but showing the components in an intermediate position.

FIGURE 14 is a sectional view showing the needle and strand structure between the pleater elements.

FIGURE 15 is a plan view of the portion of the apparatus shown in FIGURE 4.

FIGURE 16 is a sectional view taken on the line 16—16 of FIGURE 15.

FIGURE 17 is a sectional view taken on the line 17—17 of FIGURE 15.

FIGURE 18 is a sectional view taken on the line 18—18 of FIGURE 15.

FIGURE 19 is a sectional view taken on the line 19—19 of FIGURE 15.

FIGURE 20 is a sectional view taken on the line 20—20 of FIGURE 15.

FIGURE 21 is a perspective view showing the operations performed on a fabric panel by the apparatus in FIG. 3.

FIGURE 22 is a view of a stitching mechanism which may be employed in lieu of the stapling mechanism.

Referring now more particularly to the drawings, and especially to FIGURES 1 and 2, there is illustrated an insulator pad or panel 10 comprising a length of burlap 12 having its edge portions extended over strips 14. The strips 14 may be of paper or other suitable material and extend beyond the edges of the burlap and are turned onto the upper face of the burlap as shown at 16 in FIGURE 2. The turned edge portions 16 are suitably secured to the burlap, for example by gluing, stapling or sewing. To reinforce the panel, a number of strands of wire 20 are provided. Each wire 20 may if desired be undulatory or spiral in configuration as shown in FIGURES 1 and 2.

In order that the ends of the reinforcing strands 20 do not unduly project from the surface of the burlap the reinforcing strands may be knotted at their ends as shown at 22 in FIGURE 1. By utilizing strips 14 as shown, the wire knots are shielded so as not to form sharp projections which might prove a safety hazard in handling of the panels and which might undesirably lock adjacent panels together when they are stacked on one another.

Several operations are performed to make the article shown in FIGURES 1 and 2. Thus, the burlap is cut to size, the strands 20 may be given undulatory configurations and are threaded through the burlap, the end portions of the wire strands may be knotted, the strips 14 are applied to the burlap-strand assembly and folded over the edges thereof, and the entire assembly is adhered together at 18.

Referring to FIGURE 21, the fabric burlap material is taken from a supply reel 24 and advanced beneath a vertically reciprocating cutter 86 which cuts it into individual panels of a predetermined dimension (in the arrow 87 direction). The conveyor means at 70 locates each panel at a predetermined point thereon, and introduces each panel into a pleater mechanism which automatically gives the panel a pleated condition as shown at 263.

While the panel is still in a pleated condition, hollow pointed tubes or needles 344 are passed transversely through the pleats in the arrow 345 direction. Immediately thereafter the rolls 142 and 146 are rotated to drive wire strands 20 into the hollow needles. It will be noted that the wire strands are taken from supply reels 349 in straight condition. Undulations may if desired be formed in the strands by the mechanism generally designated by numeral 101. FIGURE 21 shows only one needle and one wire strand, but it will be appreciated from a study of FIGURE 3 that in actual practice a multiplicity of the needle-strand arrangements are utilized.

It will be appreciated that hollow tubes 344 act as guides to permit the wire strands to be rapidly advanced into and through the panel pleats. When the strands have been advanced into the tubes (or while they are being advanced therein) the tubes are retracted from the pleats, leaving the strands embedded or extended within the pleats. The strands are then cut and may be knotted at both ends by automatic mechanisms 367 and 369.

After the knotting operations the panel-strand assembly (with the panel still in a pleated condition) is advanced into position beneath rollers 510 which rotate about fixed axes to iron out the panel pleats and return the panel to a flat condition.

The panel is then advanced through the space between two traveling strips 14 which are taken from supply reels 30 and folded about the fabric panel edges by means of the folder structure 542.

The assembly is subsequently advanced over the adhering mechanism shown in FIG. 21 as comprising the automatic stapling guns 634. The strips are at this time still in continuous form, and are therefore cut through at appropriate points by the automatic cutters 646.

As the last operation the complete panel assembly is passed onto the trap doors 670 and 672, which automatically swing down at a preappointed time to discharge the assembly into a shipping carton 694. When the carton is filled with a certain number or weight of panels it is replaced with an empty carton.

Referring to FIGURE 3, the burlap is supplied from a reel 24 by a suitable feed roll, not shown, which is driven by any source of power. An idler roll 38 overlies and conceals the feed roll in FIGURE 3 and serves to maintain the burlap in driven engagement with the feed roll. The burlap moves through a trough 42 which serves as an accumulator space for maintaining a web supply for the cut-off structure or knife generally indicated at 86.

The burlap is fed from the bin by a rubber coated driver roll 46 and a rubber coated idler roll 48. The arrangement is such that as rolls 46 and 48 draw burlap from the trough, a switch is operated to energize the motor for the feed roll associated with idler roll 38 to replenish the supply of burlap in the trough.

The driver roll 46 is operated intermittently to advance the burlap a predetermined distance beyond the cutter or knife 86. After each intermittent advance of the continuous burlap web by the driver roll 46, the knife is operated to sever a panel of burlap from the leading end of the web, and the severed panel is deposited on and received by the conveyor chains 70 which extend longitudinally of the apparatus in laterally spaced relation, being trained over sprockets on the shaft 66 adjacent the cutter and sprockets on the shaft 57 spaced from the shaft 66 in the direction of advance of the fabric through the apparatus, or to the right as shown in FIGURES 3 and 21.

The conveyor chains are driven so that their parallel top flights, which lie in a common horizontal plane, move to the right as viewed in FIGURES 3 and 21. The chains 70 are synchronized with the driver roll 46 so that they advance the panels deposited thereon a distance equal to the advance or feed of the web of burlap by driver roll 46, the intermittent operation of the chains 70 occurring at the same time as the intermittent feed of the burlap by roll 46. Preferably the chains are also briefly operated between intermittent operations of the web driving roll 46 to advance the cut panel deposited thereon a predetermined distance to provide the desired spacing between panels.

Referring to FIGURE 5, roll 46 is operatively driven from a gear 47 which meshes with a rack 49. Power for operating the rack is derived from a conventional fluid cylinder 51, preferably positioned at one side of the machine as shown in FIGURE 5. When pressure fluid is admitted into the right end of the cylinder 51 the rack is forced outwardly to the cylinder so as to act on slip clutch 75 and gear 47 to drive the pressure roll 46 clockwise in FIGURE 5. This advances the burlap a predetermined distance through the pressure rolls. A small friction drag device 46a serves to prevent reverse movement of roll 46 during retraction of rack 49 toward cylinder 51. The drag device may consist of two blocks engaging opposite surfaces of the roll shaft, a pair of headed pins extending from one block through the other block, and compression springs surrounding the pins to urge the blocks toward one another so as to frictionally grip the roll shaft. One of the blocks may be fixedly mounted so as to provide the desired drag on the shaft.

During rotation of roll 46 the sprocket 58 is rotated to drive the chain 60, a distance corresponding to the stroke of cylinder 51. Chain 60 in turn drives sprocket 55 carried on the output portion of a conventional slip clutch 64. The output for the clutch 64 is connected with a shaft 66 carrying the sprockets 68. The sprockets 68 cooperate with sprockets 69 carried on a shaft 57 adjacent the downstream end of the machine for operatively mounting the conveyor chains 70. The chains 70 are of a length sufficient to carry the burlap from the burlap panel cutter 86 through a pleating station, needle insertion station, strand advancement station, needle retraction station, strand knotting station, and burlap unpleating station. As each panel is moved by the chains 70 it initially moves into the pleater station 96, the function of which is to distort the panel into a wave-like configuration as shown at 263 in FIGURE 21 to permit the wire strands 20 to be threaded therethrough.

Referring again to FIGURE 5, as the chain 60 is moved by the stroke of rack 49 the various sprockets 68 are rotated to advance the conveyor chains 70 a predetermined distance, as for example 22 inches. During this time the burlap supply from bin 42 is also being carried forward a corresponding distance (22 inches in the illustrative example) under the drive of roll 46. At the end of the outward stroke of rack 49 the shear blade 86 is operated to cut through the burlap and thereby provide a panel 12a resting partly on the conveyor chains 70.

On the upstroke of shear blade 86 (which is operated by a conventional electric motor) a limit switch is tripped to cause pressure fluid to be pumped into the right end of fluid cylinder 53. This cylinder has a piston rod 59 provided with a rack extension 61 meshing with a rack 63 on the input side of a conventional slip clutch 65. The output from clutch 65 is connected with the shaft 66 which carries the various sprockets 68, and accordingly as pressure fluid is delivered to the right end of cylinder 53 the rack 61 will cause sprockets 68 to be rotated to advance the chains 70 in the direction of arrow 73 by an amount corresponding to the stroke of piston rod 59. During this advancing movement, clutch 64 will slip so that no movement of roll 46 will occur. By this arrangement the conveyor chains 70 will serve to advance the cut panel 12a relative to the burlap supply to thereby provide the desired spacing between individual panels on the conveyor. This spacing is desirable in that it permits various subsequent operations to be performed simultaneously on different panels, the overall effect being one of high-volume low-cost production.

The cycle of movements involved in the burlap cutting-spacing operations begins with energization of cylinder 51. In the illustrative example, the cylinder is energized to simultaneously advance roll 46 and chains 70 a distance of 22 inches to thereby advance the burlap supply past the upraised shear blade 86 and carry a previously cut panel 12b a distance of 22 inches long the path of the chains 70. On the reverse stroke of rack 49 the slip clutch 75 and friction device 46a hold the roll 46 motionless. During or before this reverse stroke, the shear blade 86 is energized to quickly descend and then raise again to cut the panel 12a to a 22 inch length. On the upstroke of the shear blade, cylinder 53 is energized to advance rack 61 and thereby advance chains 70 to shift the panels on the chains downstream a predetermined amount, as for example 8 inches. The rack 61 may then be reversed toward cylinder 53 without transmitting motion to either the sprockets 68 or to roll 46. The cycle is repeated by again energizing cylinder 51 as previously described. The chains are provided with suitable barbs 71 to maintain the burlap in fixed positions.

In the illustrative example, the burlap panels are each cut to a 22 inch length in the direction of conveyor travel, and the adjacent panels are spaced from one another 8 inches. The panel length and spacing may of course be varied in accordance with different product sizes and operational conditions by merely varying the strokes of cylinders 51 and 53.

The illustrated arrangement is such that the fabric panels are each formed of a predetermined length and with a predetermined spacing. Also, the leading edge of each panel occupies the same position irrespective of the adjusted panel length-spacing relationship. This "leading edge position" is of advantage in that it allows the panels to be properly positioned with respect to the strand-feeding mechanisms to be described hereinafter.

Referring to FIGURE 3, the wire strands are supplied from suitable reels 98, there being one reel for each strand to be threaded into the panel. The illustrated machine is designed to simultaneously thread eighteen wire strands into the panel and there are therefore eighteen supply reels 98 for the individual strands. Each strand as it comes from its reel is straight and may be given an undulatory or spiral shape before being threaded through the panel. The mechanism for giving each wire strand its spiral configuration is diagrammatically illustrated in FIGURES 3 and 21 at 101.

Referring to FIGURES 7 and 21, the fixed housing structure 100 carries the wire feed mechanism. Each wire is fed from its reel through the undulating device 101 and into the pleated fabric by the cooperating discs 142 and 146, the wire being gripped between the peripheries of the discs. In FIGURE 21, only one pair of discs 142 and 146 for each wire is shown, but preferably two pairs of such discs are provided, as shown in FIGURE 7. A fluid cylinder 150 has a piston rod 152 provided with a rack 154 meshed with gear 156. By a series of distance multiplying gears 158 through 164, a multiplied movement is transmitted to chain 166. Chain 166 drives a shaft which carries a series of gears 170 (18 in the illustrated embodiment), the arrangement being such that each gear 170 meshes with the geared portions of the discs 146 to drive them clockwise (in FIG. 7). The discs 146 are respectively geared to the discs 142 so that as a result the individual wire strands are fed from their respective reels through the undulatory device 101 and into the pleated panel. Suitable one-way clutch means is located in the drive from rack 154 and chain 166 such that reverse movement of the rack will not reverse rotate the discs 142 and 146.

The cylinder 150 is operated to intermittently feed the eighteen wire strands simultaneously from their respective reels. After each feeding movement of the wire strands, the bar 141 extending across the wire strands descends by gravity and pulls a fresh supply of wire from the reels 98. If the wire on any reel becomes tangled so that it will not readily pull from the reel, that particular strand will remain taut and will prevent the gravitational descent of the bar 141. The bar 141 is connected with a suitable safety shut-off mechanism 131, the arrangement being such that failure of the bar 141 to descend at the dictated time will halt the cycle. The attendant may then take care of any entanglements.

The undulating device 101 is provided to impart a spiral configuration to the wires, and is fully described in our co-pending application, Serial No. 38,402.

Referring to FIGURES 6 and 7, it will be seen that after the individual wire strands have been fed through the device 101, they are forced into a pleater station 96 which operates to form and maintain the burlap panel in a pleated condition during insertion of the wire strands.

The pleater operation may best be visualized by referring to schematic illustrations in FIGURES 12 and 13. As shown in FIGURE 12, the burlap panel 12c is supported on the conveyor chains 70. Disposed beneath and between the various chains 70 are the elongated lower pleater elements or bars 284 which are each of a length corresponding to the cut length of the panel (that is the dimension in the direction of arrow 87 in FIGURE 21) plus an appropriate factor or margin. The various pleater bars 284 are carried on an elevator 288, and when the elevator is raised from its FIGURE 12 portion to its FIGURE 13 position the various pleater bars 284 are projected upwardly between the chains 70 so as to lift the burlap panel from the chains as shown in FIGURE 13. In its FIGURE 13 position the panel is located very closely adjacent to the lower edges of an upper set of pleater bars 262. There are provided a center pleater bar, designated by numeral 276, and additional pleater bars on both sides thereof. The pleater bars at the left of center pleater bar 276, as well as center pleater bar 276, are notched at their upper edges to form cam surfaces 390 for causing the bars to be cammed downwardly by leftward movement of the overlying cam bar 271. The pleater bars at the right of center pleater bar 276, as well as center pleater bar 276, are suitably notched at their upper edges to form cam surfaces 391 for causing the bars to be cammed downwardly by rightward movement of cam bar 274. The cam bars 271 and 274 are shown retracted in FIGURES 12 and 13, and the pleater bars over which they extend when retracted are suitably notched to clear the cam bars. Suitable spring means, not shown, are provided to retract the upper set of pleater elements 262 to the FIGURE 12 position when the cam bars are retracted as illustrated.

In the preferred operation the cam members or bars 271 and 274 are moved simultaneously in opposite directions so as to cross one another and sequentially depress the various pleater bars in the upper set of bars, beginning from the center pleater bar 276 and continuing laterally outwardly with depressions of successive bars on both sides of the center pleater bar. The arrangement is such that initially the center pleater bar 276 is depressed downwardly so as to cooperate with the subjacent pleater bars to tightly grip the center area of the burlap panel. Therefore, as the other pleater bars come down successively the panel will maintain its position relative to the longitudinal center line of the machine such that very little lateral bodily shifting of the panel will occur. Since the outermost pleater bars will not come down until the innermost pleater bars have been depressed there will be no excessive strain placed on the burlap such as might tear or deform the burlap fibers.

FIGURE 6 provides an elevational view of the pleater station which, as will be seen, comprises two ribbed beams 107 and 109 supported at their ends by pillars 111. A bridge structure 113 extends across the space between beams 107 and 109 to rigidify them and provide a support for housing 115. Cylinder 216 has a rod 218 which extends into housing 115 to operate cam bars 271 and 274 by suitable mechanism not shown.

The foregoing brief description provides a general outline of the mode of operation of the panel pleating structure. For a more detailed description reference is made to applicants' co-pending parent application, Serial No. 38,402.

It will be noted from FIGURE 14 that the lower edge portion of each pleater element 262 is provided with a series of slots 300. In the illustrated mechanism each of the pleater elements 262 is provided with eighteen slots corresponding in number to the number of wire strands to be inserted through the fabric pleats. Each of the pleater elements in the lower set of pleater elements 284 is provided with a corresponding number of slots 302 in its upper edge, the arrangement being such that when the pleaters are in their FIGURE 14 positions a series of eighteen passages is formed through the pleater element assembly.

The purpose of these passages is to permit hollow needle structures to be driven through the fabric pleats, said needle structures serving as guides for subsequent insertion of the spiral wire strands previously described. Power for the needle insertion operation is derived from a fluid cylinder 306 shown in FIGURE 7. The piston rod for cylinder 306 carries a rack 308 which meshes with a gear 310 carried by the shaft of a larger gear 312. Gear 312 in turn meshes with a gear 314 carried by the shaft of a relatively large gear 316 which meshes with the gear 320 carried on the shaft of a larger gear 318. The gear 318 meshes with a rack 326 which is connected at one end to a crosshead 330 slidably supported on fixed guide rods 334. The crosshead 330 carries eighteen hollow needles 344, the arrangement being such that energization of cylinder 306 is effective to move rack 326 to the left as viewed in FIGURE 7 to thereby carry the needles 344 through the pleater elements and pleated fabric panel as shown in FIGURE 14. The slots 300 and 302 in the adjacent edges of the pleater elements 262 and 284 line up transversely of the machine when the pleater elements are moved toward each other as shown in FIGURE 14 to provide elongated passages adapted to receive the respective needles. The needles are actually hollow tubes and are inserted through the pleated fabric prior to insertion of the wires to serve as guides and prevent deflection or jamming of the wires during insertion of the latter.

The leading edge of each needle is sharply pointed as at 360, with the edge portion 362 tapering back at a small angle to form a pointed end operative to easily penetrate the burlap panel during high speed insertion of the needle. When the needles are located within the pleater elements as shown in FIGURE 14, the cylinder 150 (FIGS. 6 and 7) is energized to feed the wire strands through the spiralling mechanism and into the hollow needles to the FIGURE 14 position. The hollow needles protect the wire strands during insertion so they will not interfere with the burlap threads.

It is contemplated that the insertion of the needles will be completed before introduction of the wires into the pointed ends of the needles. However, the needles may retract during the advance of the wires, the most important aim being to have at least the ends of the wire strands within the needles as the strands are fed through the pleats. However, the needles may remain in the extended position within the pleater station during the entire strand advancing operation.

After insertion of the wire strands into the extended hollow needles, the hollow needles are withdrawn to leave the strands threaded through the pleats of the fabric panel. The wire strands will then be severed and knotted at both ends. Preferably, the strand knotting operation is performed at the conclusion of the strand insertion operation while the fabric is in a pleated condition. The left hand knotter mechanism is shown at 367 and the right hand knotter at 369.

Referring to FIGURE 1, it will be noted that the ends of the wire strands in the finished article are curled around or knotted. The strand knotting operation is preferably performed at the conclusion of the strand insertion operation while the fabric is in a pleated condition (FIG. 14). The leftmost knotter mechanism is 367 as shown in FIGURES 8–10, and the rightmost knotter 369 is shown in FIGURE 11. The positions of these knotter mechanisms with respect to the other apparatus is best shown in FIGURES 6 and 7.

Referring to FIGURE 8, the leftmost knotter comprises an elongated bed plate 371 having a series of spaced blocks 379 secured thereon to define eighteen separate grooves 373, the arrangement being such that one of the strands 20 travels through each groove in the direction of the arrow B during the strand insertion operation. The mechanism is shown in FIGURE 8 with the parts thereof in the positions they occupy during the knotting operation, and the space through which the strand travels during the strand insertion operation is therefore restricted by the knotter mechanisms.

Power for the knotting operation is derived from three sources. Thus, referring to FIGURES 6 and 7 there is provided a fluid cylinder 368 carried on a bracket-forming extension 370 of the elevator 288. The piston rod for cylinder 368 is connected with eighteen parallel plungers 372 (FIGS. 7 and 8) by means of a crosshead 377 so that energization of cylinder 368 is effective to move the plungers upwardly towards the bed plate 371 to the FIGURE 8 position. Each plunger 372 carries a pin-like mandrel element 374 which projects upwardly above the bed surface 366 to form a mandrel surface for bending of the wire strand therearound during the knotting operation. Each plunger also carries a pin 375 which functions as a back-up device for the wire strand during the knotting operation.

In order to bend the wire strands around mandrels 374 there is provided a pin-like bending element 376 carried on a rotary head 378. Bearings are provided at 380 and 382 for rotatably supporting the head 378 in a carrier structure generally indicated by numeral 384. Power for rotation of the head 378 is derived from a fluid cylinder 385 and rack 386. The drive from rack 386 comprises a gear 388 carried on shaft 390, a second gear 392 carried on shaft 390 and a rack 394 meshed with gear 392. The vertical face 396 of rack 394 is provided with a slot 398 which receives an extension 400 of a relatively long rack 402. It will be noted from FIGURE 9 that rack 386 is of a relatively short length. However, the rack 402 is long enough to span the entire bank of knotter heads 378, with the teeth thereof engaging the gear portions 406 of the individual heads 378 as shown in FIGURE 8.

It will be appreciated that movement of rack 386 (by cylinder 385) in one direction is effective to rotate all of the knotter heads 378 in one direction for effecting a strand knotting operation. Reverse movement of the rack 386 is effective to return the heads 378 to their initial positions.

Between successive knotting operations the carrier 384 is retracted upwardly away from the bed surface 366 by means of the fluid cylinder 408. Cylinder 408 is mounted atop a bridge structure 410 located on an elongated housing 409. As will be seen from FIGURE 6, housing 409 is mounted at its opposite ends on the beams 107 and 109. The piston rod 412 for cylinder 408 is connected with a crosshead 414 which carries the two depending rods 416 at its opposite ends. The lower end portions of these rods are anchored to the carried 384 by means of cross pins 418. The arrangement is such that pumping of fluid into the lower end of cylinder 408 is effective to raise the carrier 384 upwardly from bed surface 366 to permit passage of the wire strands over the bed surface and into the pleater elements.

After each pleater operation pressure fluid is pumped into the upper end of cylinder 408 to quickly lower carrier 384 toward surface 366. As the carrier nears surface 366 cutter 210 slices through the wire strand to cut off the length thereof to the right of the cutter. During the cutoff operation the clamp structure 420 is effective to grip the wire and retain it in proper position for ensuring a clean cut at the desired location therealong. Clamp structure 420 comprises a series of spaced finger members 422 projecting downwardly from the carrier 384, the space between adjacent fingers being occupied by strand gripping elements 424, and the various strand gripping elements being pivotally mounted by means of a pin 426 extending through finger members 422. It will be understood that in a construction having eighteen wire strand feeders there will also be employed eighteen wire gripper elements 424.

Each of the wire gripper elements is individually biased in a downward direction by means of a compression spring 428, said spring operating on the gripper element via a hollow plunger 430. The operation is such that as the carrier 384 is lowered its pivotally mounted gripper elements 424 strike the wire strands and compress the springs 428 to thereby provide a tight grip on the strands irrespective of any slight variation in vertical dimension of the various gripper elements spacing of bed surface 366 from the carrier, or variation in strand thickness.

It will be noted that the tip of cutter 210 is located slightly below the lower face 432 of the knotter head 378. Face 432 acts as a presser element to cooperate with the upper face of the fixed bushing 434 in ironing out a short portion of the wire strand from its spiral configuration, the purpose being to prevent an intermediate portion of the wire strand from interfering with its extreme end portion during the knotting operation. In this connection the major diameter of the spiral strand convolution is in an illustrative case in the neighborhood of one-quarter inch and the diameter of the wire is in the neighborhood of .040 inch. The movement of the carrier is preferably such as to leave a clearance of about .050 inch between face 432 and the upper face of bushing 434.

When rack 386 is moved to rotate the heads 378 the resultant rotation of each bending element 376 is such that a wire end portion adjacent cutter 210 is curled around the mandrel 374 and depressed into the annular opening 436 as the pin 376 nears the end of its rotary movement. Pin 376 is shown in FIGURE 8 adjacent the end of its movement. It initially takes a position spaced about one hundred eighty radial degrees from the FIGURE 8 position, so that it acts as a bending element for the end portion of the wire strand. During the final stage of the bending movement the end portion of the wire may cam against the registering wire portion to be deflected into the recess 436 so as to achieve the cross condition shown in FIGURE 1.

The complete sequence of movements in operation of the FIGURE 8 knotter structure is as follows. With the carrier 384 in a raised position, at conclusion of the strand feeding operation the cylinder 408 is energized to quickly lower the carrier 384 and cut off the wire strand. Simultaneously with lowering of the carrier 384 the plungers 372 are powered upwardly by cylinder 368 so that the mandrel 374 is guided into the central opening 440 in each head 378. Rack 386 is then powered to rotate the various knotter heads 378 for causing the bending elements 376 to be rotated around the mandrels 374 to effect the knotting operations. Carrier 384 and plunger 372 are then powered apart to separate or strip the elements 374 and 376 from the knot. Elevator 288 (FIGURE 7) is then lowered to lower the lower set of pleater elements so that the fabric-wire strand assembly is deposited onto the conveyor chains 70 for carryover to the next operating station.

The right knotter structure 369 shown in FIGURE 11 is similar to the left knotter in many respects, and similar reference numerals are therefore employed wherever applicable. In the FIGURE 11 construction a fluid cylinder 442 is mounted on a fixed support structure 444 with its piston rod 446 connected with a crosshead 448, said crosshead carrying a depending connector rod 450 which is linked at 452 to a pair of levers 454. The linkage 452 preferably comprises an elongated shaft 456 extending between the two levers 454, said levers being preferably located at opposite end portions of the knotter apparatus and being fulcrumed on an elongated shaft 460 carried by support structure 444. The two levers 454 are linked to an elongated shaft 462 which carries a bank of reciprocable plungers 372, each of the plungers carrying a mandrel and back-up pin similar to the corresponding elements of the FIGURE 8 structure. Each of the mandrels cooperates with a rotary knotter head 378 similar to the corresponding head in the FIGURE 8 construction. The various knotter heads are rotatably supported in a carrier 464 which is slidably mounted on face 445 of support structure 444. Carrier 464 is supported at its ends by the two rods 466 which depend from crossheads 448.

In operation of the FIGURE 11 construction, energization of the fluid cylinder 442 is effective to move rod 450 upwardly for downward retraction of the plungers 372; simultaneously the carrier 464 is drawn upwardly by the rods 466 to free the right end area of the fabric-wire strand article for movement by the conveyor chains 70. After a predetermined movement of the conveyor chains the cylinder 292 is energized to raise elevator 288. Thereafter piston rod 446 is powered downwardly to bring elements 378 and 372 together, and rack 386 is powered to effect a knotting operation of pin 376.

During the knotting operations the fabric panel is held in a pleated condition with the needles of course withdrawn. The wire strands 20 frictionally engage the burlap fibers and tend to hold the pleated form of the panel. Accordingly, after the inserted wire strands have been knotted, the fluid cylinder 216 is operated to allow the upper pleater elements to return to the position of FIGURES 12 and 13, the cylinder 292 is operated to lower the elevator 288 carrying the lower pleater elements to the position of FIGURE 12, and the strand reinforced panel is moved to a flattening or unpleating station which has the rubber-coated rolls 510. The panel is carried from the pleated to the unpleating station by the conveyor chains 70 during subsequent intermittent operation thereof. The rolls 510 flatten the pleated panel so that it assumes substantially the configuration shown in FIGURE 2. The flattening station is more fully described in our co-pending application, Serial No. 38,402.

By reference to FIGURE 17, it will be seen that strips, which may be paper for example, for protecting the edges of the burlap-wire strand assembly are taken from a supply roll 540. In its supplied condition it is in the form of a flat web, and before it can be completely secured to the edges of the burlap-wire strand assembly it must be folded so as to have a wrap-around relationship with respect to the burlap lateral edges. There is thus provided the folder mechanism indicated generally by numeral 542 in FIGURE 15.

Prior to introduction of the strip 14 into the folder mechanism, it may be passed through an adhesive-applying station 544, best shown in FIGURE 17. As shown in the drawings said station comprises a conventional gluepot 546 having a relatively large smooth-surfaced roll 548 located to dip into a body of liquid glue 550 in the gluepot. Power for drawing the strip 14 over the roll 548 is derived from a heavy rubber roller 552 which is adapted to be driven from the previously mentioned conveyor chains 70. By this arrangement the burlap travel and strip 14 travel are correlated with respect to one another such as to prevent any buckling of or strain on the strip.

Referring again to the adhesive station 544 (FIGURE 17), the strip 14 is maintained in engagement with roll 548 by the idler rolls 554, 556 and 558. The strip is turned from a generally horizontal plane into a generally vertical plane by means of the vertical guide roll 560. As the strip emerges from the guide roll 560 it takes a right angle turn and enters into the folder structure 542.

The folder structure 542 is in the form of guides adjacent the opposite lateral edges of the panels. At their entrant ends, or upstream ends, the guides are in the form of vertical flat plates as shown in FIGURE 17, having the inturned flanges 562 above and below the edges of the panel. The guides at their exit or downstream ends are substantially U-shaped, as shown in FIGURE 19, with the flanges of the U close together and substantially parallel and embracing opposite sides of the edge portions of the panel. The guides flare gradually from their exit ends toward their entrant ends so that the U-shape formed thereby gradually opens toward the entrant end, as will be apparent from a consideration of FIGURES 17–19.

By reference to the three sectional views, FIGURES 17, 18 and 19, it will be seen that during travel of the strip 14 through the folder it is progressively converted from a substantially flat configuration (FIG. 17) to a V-shaped configuration (FIG. 19). The folder is provided with the inturned flanges at 562 to guide the strip and prevent it from in any way losing contact with the folder.

As each strip emerges from its folder it wraps about the lateral edge of the burlap panel and thence travels with the burlap to a position overlying a fixed block 564 (FIG. 16). Block 564 mounts a series of automatic air-operated stapling guns 634, each being provided with an air pressure line 635 for automatic operation at the desired point in the sequence (i.e. when the burlap assembly is motionless).

Cooperating with block 564 is a second movable block 566 which is moved to a clamping position on the strip by means of the fluid cylinder 568. Suitable links are provided at 570 to guide block 566 in its movement. It will be understood that block 566 acts as an anvil to clinch the staples driven upwardly from the stapling guns 634. The use of stapling guns is as previously noted optional to the aforementioned use of sewing and gluing. For many applications the use of sewing produces the most satisfactory product. The sewing can be carried out with conventional sewing machine heads such as shown in FIGURE 22.

In the illustrated embodiment the strip 14 is affixed to each edge of the burlap while it is in the form of a continuous web. It thus becomes necessary to sever the strip before discharge of the panel assembly from the machine. For this purpose there is provided an air cylinder 640 having a pivotal mounting at 642 and having a piston rod 644 connected with a pair of crank arms 645 by means of a cross pin 648. The cranks 645 are fulcrumed as a unit on a fixed shaft 650, so that introduction of pressure fluid into the lower end of cylinder 640 is effective to move the cranks 645 in a clockwise direction (FIGURE 20). Each of the cranks carries a cutter bar 646 which during clockwise motion of the cranks slices through the subjacent strip. The cutter bars are suitably mounted and adjusted so that their operative edges are spaced the desired distance (eight inches in the illustrated embodiment) such that the strip is severed at a point coincident with the corresponding front or rear edge of the burlap panel. Different panel dimensions will of course necessitate different adjustments of the cutter bars.

After cutting of the strip material it is preferred to immediately discharge the panel assembly from the machine, and one desirable mechanism for accomplishing this purpose is shown in FIGURE 4. The most advantageous direction of discharge for the panel is downwardly into its shipping carton, and accordingly it is not desired to support the panels from subjacent conveyors such as the conveyor chains 70 during the discharge operation, since such conveyor chains would be in the desired path of discharge.

To effect the discharge operations there may be provided the overhead conveyor mechanism defined by the rubber belts 660. As shown in FIGURES 4 and 15, these belts are trained around pulleys 662 and 664. Pulleys 664 are located on the same shaft as the aforementioned pressure roller 552, wihch is driven from the conveyor chains 70. Thus the conveyor chains provide operative power for the belts 660 such as to synchronize the movement of the various panels throughout their travel in the machine and permit the panels to be discharged in an orderly sequence.

In the illustrated arrangement the discharge mechanism comprises a pair of trap doors 670 and 672 fulcrumed respectively on the pivot shafts 674 and 673.

These trap doors extend entirely across the lateral dimension of the fabric panels and are retained in their FIGURE 4 positions by means of the fluid cylinders 678. However, when a panel has been shifted into position on the trap door as shown at 121 in FIGURE 4, pressure fluid may be pumped into the upper end of each cylinder 678 to retract the piston rods 680 into the cylinders for thereby swinging the trap doors downwardly about their pivot shafts in such manner as to cause the fabric panel to drop through the open space formed between the swung-down doors.

As will be seen from the drawings, the space below the trap doors is occupied by a platform or framework 690 having the idler rolls 692 journaled thereon. The arrangement is such that an open topped box or shipping carton 694 of cardboard or the like may be manually or otherwise slid onto the rollers 692 to a position for reception of the panels as they are sequentially dropped through the trap doors. Suitable counter mechanism may be employed to notify the attendant when a desired number of panels have been deposited into the shipping boxes. If desired the device may be given an automation character by employing mechanism for stopping the machine after the desired number of panels have been deposited in the box or by energizing a power device for shifting the box off of the platform 690 and replacing it with another empty box. The degree of automation will of course depend on such factors as volume of production, cost of product, and particular facilities of the manufacturer.

During the previous description the invention has for the most part been described with reference to the use of stapling and gluing as the means for securing the edging onto the lateral edges of the fabric panels. It is herein noted, however, that other means of attachment can be employed. For example, if desired the edging can be secured to the fabric panel through the use of the sewing machine stitchers or heads shown in FIGURE 22. FIGURE 22 is taken in the same general direction as FIGURE 16, and it will be understood that the sewing machine head 570 there shown may be employed in the same general location as the previously described stapling guns 634.

As with the previously described arrangement, the edging may be fed from supply roll 540 into the folder structure 542 to cause it to be wrapped around the lateral edges of the burlap panel 12g.

The sewing machine head 570 is arranged downstream of the folder 542, and as the burlap panel 12g is conveyed by the chains 70 the sewing machine needle 572 is vertically reciprocated to stitch the edging to the burlap fabric.

The use of stitching as opposed to stapling provides a more extensive locking of the strips 14 to the burlap, and therefore the previously described gluing operation can in many cases be eliminted. In this connection it will be noted from FIGURE 22 that the illustrated supply roll 540 introduces the strip 14 directly into the folder 542 without first traversing a gluing station such as is employed in the FIGURE 17 illustration.

It will be understood that during the periods that the burlap panels are motionless (i.e. when the conveyor chains 70 are stopped) it is not desired to operate the sewing machine heads 570. Thus, each of the sewing machine heads is preferably operated in direct synchronism with the conveyor chains 70, and for this purpose there is provided a chain drive 574 powered in any suitable manner from the conveyor chains 70. The power can be taken at any desired point from the conveyor chains 70, but as an example, the drive chain 574 could be driven from a sprocket carried on the previously described shaft 57 (FIGURES 4, 5, and 15). It will be understood that chain 574 is trained around a sprocket carried on the shaft 578 which extends from sewing machine head 570 (FIG. 22). The shaft 578 is of course suitably connected with the head 570 in a manner to provide the desired reciprocation of needle 572 for performing the desired stitching operations. It will be understood that by the described arrangement the operation of sewing machine head 570 is economically synchronized with the operation of chains 70 so as to provide the desired stitch pattern without any jamming of the sewing machine.

The apparatus illustrated and described herein is operated so as to cut the fabric panels to lengths before pleating, insertion of the reinforcing strands and application of the covering strips 14 to the opposite edges of the panel. However, the panels could be cut to length after insertion of the strands and application of the strips 14. The shear blade 86 can be placed at the downstream end of the machine so that the severing of the individual panels occurs only after all of the other operations, pleating, strand insertion, unpleating, application of strips 14, etc., have been completed. Apparatus as thus modified, in which the panels are severed after the last operation, is described in our co-pending application Serial No. 38,402. Accordingly, the piece of material into which the strands are inserted and upon which the covering strips 14 are applied may be either the individual panels or the continuous web before it is severed into panels. Stated another way, the panels into which the strands are inserted and the strips 14 are applied may be either separate members already severed from the continuous web, or they may be unsevered and still an integral part of the web. When in accordance with the modification in which the panels are severed as the very last operation, the fabric material will be advanced in continuous form from the unpleating station which may have the mechanisms 542 therein for folding the edging material around the fabric edges as shown in FIGURES 17–19. Adhering of the edging or strip material 14 to the fabric may be effected by various means, as for example by gluing mechanisms, stapling mechanisms and/or sewing mechanisms as heretofore described. Whether the panels are severed before pleating, illustrated and described, or as the final operation, the operation of the mechanism for folding the edging material around the fabric edges and for securing the same thereto will be substantially the same.

What we claim as our invention is:

1. Apparatus for making a strand-reinforced piece of material having a protective covering over the ends of the strands, comprising means for conveying a piece of material along a predetermined path, means at a point along said path for inserting reinforcing strands into the piece of material in a direction transversely of said path, means spaced from said strand inserting means in the direction of movement of the material for applying protective covering upon the ends of the inserted strands, said covering comprising elongated strips separate from said piece of material, said applying means comprising means for advancing said strips in the direction of movement of the material adjacent said opposite edges thereof, means for folding the advancing strips over said opposite lateral edges, and means for securing the folded strips to said opposite lateral edges.

2. The apparatus defined in claim 1 wherein said folding means comprises elongated guides adjacent the opposite edges of said material having entrant ends to receive said strips, said guides extending from their entrant ends in the direction of movement of said material toward their exit ends, said exit ends being U-shaped to closely confine said opposite lateral edges of said material and to fold said strips over said opposite lateral edges during the advance of said material and of said strips along said path.

3. The apparatus defined in claim 2, wherein said guides are each formed with angularly related, connected flanges folded closely toward one another at said exit end to define the aforesaid U-shape and gradually flaring apart toward said entrant end.

4. The apparatus defined in claim 3, wherein said flanges extend at an angle of approximately 180° to each other at said entrant end.

5. The apparatus defined in claim 2, wherein the means for advancing said strips comprises rollers overlying the opposite lateral edges of said material beyond the exit ends of said guides in bearing engagement with the strips folded over said opposite lateral edges.

6. The apparatus defined in claim 5, wherein the means for securing said strips to said opposite lateral edges of said material is located between said rollers and said guides.

7. Apparatus for making a strand-reinforced piece of fabric material having protective strips on opposite edges thereof to cover the ends of the strands, comprising means for intermittently advancing the fabric along a predetermined path, means for inserting reinforcing strands into the fabric in a direction transversely of said path between intermittent advances thereof, means spaced from said strand-inserting means in the direction of movement of the fabric for advancing protective strips along the opposite lateral edges of and in synchronism with the fabric, means for folding said protective strips over the opposite lateral edges of the fabric to cover the ends of the inserted strands, and means for securing the folded protective strips to said opposite lateral edges.

8. The apparatus defined in claim 7, wherein said folding means comprises elongated guides adjacent the opposite edges of the fabric having entrant ends to receive said strips, said guides extending from their entrant ends in the direction of movement of the fabric toward their exit ends, said guides being formed with angularly related, connected flanges folded closely together at said exit end to define a U-shape closely confining the opposite lateral edges of the fabric and folding said strips over said opposite lateral edges during the advance of the fabric and of said strips along said path, said flanges gradually flaring apart toward said entrant end.

9. The apparatus defined in claim 8, wherein said flanges extend at 180° to each other at said entrant end.

10. The apparatus defined in claim 9, wherein means are provided for applying adhesive to said strips before they enter said guides, and means operated during the intervals between intermittent advances of the fabric are provided for securing the folded strips to said opposite lateral edges at longitudinally spaced points.

11. The apparatus defined in claim 9, wherein means, operated by and in synchronism with the means for advancing the fabric are provided for securing the folded strips to said opposite lateral edges.

12. The apparatus defined in claim 9, wherein means are provided for severing said strips after they have been folded over and secured to said opposite lateral edges.

13. Apparatus for making a strand-reinforced piece of material having a protective covering over the ends of the strands, comprising means for conveying a piece of material along a predetermined path, means at a point along said path for inserting reinforcing strands into the piece of material in a direction transversely of said path, means spaced from said strand inserting means in the direction of movement of the material for applying protective covering upon the ends of the inserted strands, said covering comprising elongated strips and said applying means comprising means for folding said strips over the opposite lateral edges of said material.

14. Apparatus for making a strand-reinforced piece of material having a protective covering over the ends of the strands at least along one edge of the piece of material, comprising means for conveying the piece of material along a predetermined path, means at a point along said path for applying reinforcing strands to the piece of material, and means spaced from said strand applying means in the direction of movement of the piece of material for applying a protective covering along said one edge of the piece of material upon the ends of the strands.

15. The apparatus defined in claim 14, wherein said covering comprises an elongated strip and said cover applying means comprises means for folding said strip over said one edge of the piece of material.

16. Apparatus for making a strand reinforced piece of material having protective strips along opposite edges thereof covering the ends of the strands, comprising means for intermittently advancing the piece of material along a predetermined path, means for inserting reinforcing strands into the piece of material in a direction transversely of said path between intermittent advances thereof, and means spaced from said strand inserting means in the direction of movement of the piece of material for applying protective strips along the opposite lateral edges of the piece of material to cover the ends of the inserted strands during the advances of the piece of material.

17. Apparatus for making a strand-reinforced piece of fabric having a protective covering along one edge thereof applied over the ends of the strands, said apparatus comprising means for conveying the fabric along a predetermined path, means at a point along said path for applying the reinforcing strands to said fabric in spaced, generally parallel relation to one another and extending transversely of said path, and means spaced from said strand-applying means in the direction of movement of said fabric for applying the covering along said one edge of the fabric over the ends of the strands.

References Cited by the Examiner
UNITED STATES PATENTS

| | | | |
|---|---|---|---|
| 1,749,118 | 3/1930 | Wechsler | 112—137 |
| 2,282,200 | 5/1942 | Neuman | 112—252 X |
| 2,362,462 | 11/1944 | Belcher et al. | 112—11 X |
| 2,630,772 | 3/1953 | Ederer | 112—2 |
| 2,797,656 | 7/1957 | Reid | 112—2 |
| 3,010,489 | 11/1961 | Lenart et al. | 140—3 |
| 3,070,135 | 12/1962 | Thompson et al. | 140—24 |

CHARLES W. LANHAM, *Primary Examiner.*